(12) United States Patent
Nogueira et al.

(10) Patent No.: US 7,479,005 B2
(45) Date of Patent: Jan. 20, 2009

(54) MOLDING SYSTEM HAVING CLAMP ACTUATOR HAVING ACTUATOR MOUNT

(75) Inventors: Joaquim Martins Nogueira, Everett (CA); Peter Adrian Looije, Newmarket (CA)

(73) Assignee: Husky Injection Molding Systems Ltd, Bolton, ON (CA)

( * ) Notice: Subject to any disclaimer, the term of this patent is extended or adjusted under 35 U.S.C. 154(b) by 94 days.

(21) Appl. No.: 11/739,162

(22) Filed: Apr. 24, 2007

(65) Prior Publication Data

US 2008/0268084 A1   Oct. 30, 2008

(51) Int. Cl.
*B29C 45/64* (2006.01)

(52) U.S. Cl. .................... 425/595; 425/451.9

(58) Field of Classification Search ............... 425/595, 425/451.9
See application file for complete search history.

(56) References Cited

U.S. PATENT DOCUMENTS

| | | | | |
|---|---|---|---|---|
| 3,606,641 | A | * | 9/1971 | Carrieri et al. ............... 425/595 |
| 3,801,256 | A | * | 4/1974 | Farrell ........................ 425/595 |
| 4,201,533 | A | | 5/1980 | Holzschuh |
| 4,504,208 | A | * | 3/1985 | Kurumaji et al. ............ 425/595 |
| 5,133,655 | A | | 7/1992 | Schad et al. |
| 5,868,989 | A | | 2/1999 | Glaesener et al. |
| 5,922,372 | A | | 7/1999 | Schad |
| 6,093,361 | A | | 7/2000 | Schad |
| 6,132,201 | A | | 10/2000 | Looije et al. |
| 6,210,144 | B1 | | 4/2001 | Mailliet et al. |
| 6,250,905 | B1 | * | 6/2001 | Mailliet et al. ............ 425/595 |
| 6,261,505 | B1 | | 7/2001 | Glaesener |
| 6,328,553 | B1 | | 12/2001 | Hertzer et al. |
| 6,334,768 | B1 | | 1/2002 | Looije et al. |
| RE37,827 | E | * | 9/2002 | Schad ........................ 425/595 |
| 6,524,091 | B2 | * | 2/2003 | Romi ......................... 425/595 |
| 6,821,463 | B2 | | 11/2004 | Di Dio et al. |
| 6,893,250 | B2 | * | 5/2005 | Meschia et al. ............. 425/595 |
| 6,945,765 | B2 | * | 9/2005 | Roetzel ....................... 425/595 |
| 7,402,037 | B2 | * | 7/2008 | Jung et al. .................. 425/595 |
| 2003/0198709 | A1 | | 10/2003 | Ralph et al. |
| 2003/0215541 | A1 | | 11/2003 | Roetzel |
| 2005/0287246 | A1 | | 12/2005 | Looije |

FOREIGN PATENT DOCUMENTS

GB 2064415 A 6/1981
JP 4147809 A 5/1992

* cited by examiner

*Primary Examiner*—James Mackey

(57) ABSTRACT

Disclosed is: (i) a molding-system clamp, including: a lock, a lock actuator, and a connecting rod connecting the lock actuator to the lock, (ii) a molding system having the molding-system clamp as described above, and (iii) a molded article manufactured by usage of a molding system having the molding-system clamp as described above.

8 Claims, 13 Drawing Sheets

MOLDING SYSTEM HAVING CLAMP ACTUATOR HAVING ACTUATOR MOUNT

TECHNICAL FIELD

The present invention generally relates to, but is not limited to, molding systems, and more specifically the present invention relates to, but is not limited to: (i) an actuator mount of a molding system, the molding system including a clamp actuator, (ii) a clamp actuator of a molding system, the clamp actuator including an actuator mount, and (iii) a molding system, including a clamp actuator having an actuator mount.

BACKGROUND

Examples of known molding systems are (amongst others): (i) the HyPET (trademark) Molding System, (ii) the Quadloc (trademark) Molding System, (iii) the Hylectric (trademark) Molding System, and (iv) the HyMET (trademark) Molding System, all manufactured by Husky Injection Molding Systems (Location: Canada; www.husky.ca).

U.S. Pat. No. 5,133,655 (Inventor: Schad et al.; Published: Jul. 28, 1992) discloses a friction clamp assembly for securing a mold of an injection molding machine in a closed position. The clamp assembly includes a column rigidly secured to a moving platen carrying a mold half and a gripper bush assembly for frictionally engaging and locking the column in a desired position. The clamp assembly further includes a clamp piston for clamping the moving platen in a mold closed position. The clamp assembly transmits a clamping force to portions of a moving platen other than end portions via the column so that platen parallelism is maintained during closing, injection and hold pressure portions of a molding cycle while platen bending is substantially avoided.

U.S. Pat. No. 5,868,989 (Inventor: Glaesener et al; Published: Feb. 9, 1999) discloses a securing/clamping assembly for clamping platens of an injection molding machine. The clamp assembly includes a mechanism for guiding the platens and a body member having a structure which is movable as a single unit. The body member is adapted to be attached with at least one of the platens and includes a mechanism for securing the mechanism for guiding and for conveying a clamping force to the platens for clamping the platens during injection molding. The mechanism for securing includes an engagement mechanism for placing the mechanism for securing into and out of locking engagement with the mechanism for guiding, such that when the engagement mechanism is out of locking engagement with the mechanism for guiding, the body member and the mechanism for guiding are relatively movable.

U.S. Pat. No. 5,922,372 (inventor: Schad; Published: Jul. 13, 1999) discloses a securing/clamping system for use with platens of a molding machine including a stationary platen having a first mold half affixed thereto, a movable platen having a second mold half affixed thereto, the movable platen traveling along a plurality of tie bars, and reciprocatively moving between a mold open and mold closed position, and a system for applying a clamping force to the movable platen.

U.S. Pat. No. 5,928,685 (Inventor: Schad; Published: Jul. 27, 1999) discloses a securing/clamping system for use with platens of a molding machine including a stationary platen having a first mold half affixed thereto, a movable platen having a second mold half affixed thereto, the movable platen traveling along a plurality of tie bars, and reciprocatively moving between a mold open and mold closed position, and a system for applying a clamping force to the movable platen.

U.S. Pat. No. 6,093,361 (Inventor: Schad; Published: Jul. 25, 2000) discloses stationary and movable platens are provided having mold halves affixed thereto. The movable platen is reciprocatively moved between a mold open and a mold closed position, and a clamping force is applied to the movable platen in the mold closed position, and a mold break force is applied to the movable platen in the mold closed position. At least one column is provided having a first end affixed to the movable platen, and a threaded rod engages a threaded member which is operatively connected to the column.

U.S. Pat. No. 6,132,201 (Inventor: Looije et al.; Published: Oct. 17, 2000) discloses an improved drive system for rotatable members in molding machines. The drive system includes at least one frameless, brushless electric motor having a stator mounted to the machine and a rotor directly coupled to the rotatable member. Each rotor is coupled to the rotatable member so that the axis of rotation of the rotor is concentric to the axis of rotation of the rotatable member.

U.S. Pat. No. 6,261,505 (Inventor: Glaesener; Published: Jul. 17, 2001) discloses a mechanism for applying a clamping force to a columnar member, such as a tie bar, is described. The clamping mechanism includes a compressible member surrounding the columnar member for gripping the columnar member and transmitting a clamping force thereto, which compressible member is slidable along the columnar member. The mechanism further includes a clamping piston for applying a clamping force, which clamping piston has a bore with an engaging surface for receiving and frictionally engaging the compressible member. The frictional engagement between the compressible member and the engaging surface prevents any relative sliding movement between the compressible member and the clamping piston. The mechanism still further includes a sliding piston for applying a clamping force and for causing the compressible member to slide along the columnar member from an initial position to a preload position where the compressible member is compressed by contact with the engaging surface as the compressible member moves between the positions. Compression of the compressible member causes it to grip the columnar member and apply an initial clamping force. The main clamping force is applied to the compressible member (and hence to the tie bar) by moving the clamping piston to a clamping position. A method for applying a clamping force to a mold using the clamp mechanism is also described.

U.S. Pat. No. 6,328,553 (Inventor: Hertzer et al; Published: Dec. 11, 2001) discloses a self-compensating support skate for an annular hydraulic ram mounted in the front stationary platen of a "two-platen" injection molding machine. The hydraulic ram fits into a central bore in the stationary platen and connects directly to a relatively thin die platen that provides a mold mounting surface. The purpose of the skate is to prevent movement (tilting) of the die platen and the resulting misalignment with the movable platen when the mold is attached. The skate is adjusted during assembly to compensate for the tolerance stack-up in the ram assembly. The "zero" clearance is maintained by disc springs within the skate that compensate for the expansions and contractions of the large diameter parts due to temperature variations. The die platen is held in the aligned position by contact with the lower tie rods.

U.S. Pat. No. 6,334,768 (Inventor: Looije et al; Published: Jan. 1, 2002) discloses a blow clamp for a blow molding apparatus having first and second platens movable between a closed and an open position. The blow clamp includes at least two clamping piston nuts secured to the first platen and respective tie bars secured to the second platen for registering with the clamping piston nuts. The tie bars are rotatable by an actuator between engaging and disengaging configurations. In the engaging configuration the tie bars are axially fixed relative to the clamping piston nuts. In the disengaging configuration the tie bars are freely axially movable relative to the clamping piston nuts. Means are provided to apply an axial closing force to the clamping piston nuts in which force is transferred to the tie bars through engagement with the clamping piston nuts in the clamping configuration.

United States Patent Application Number 2003/0198709 (Inventor: Ralph et al.; Published: Oct. 23, 2003) discloses an injection molding machine with a vertically operating clamp mechanism that provides a pair of locking devices on the upper movable platen to lock the locking rods for high tonnage clamping forces. Each locking device uses spring-biased actuating rods to simultaneously lock two locking rods to the movable platen in an "always on" arrangement. A power on actuator is provided to release the locking device for raising and lowering the movable platen. A vertical ladder frame is provided for guiding the movable platen when it is raised or lowered. Additionally, a lift mechanism is provided for a rotary table carrying the lower mold halves.

United States Patent Application Number 2005-0287246 (Inventor: Looije; Published: Dec. 29, 2005) discloses a clamp piston assembly including a body portion in which a pocket is provided. The pocket is arranged to receive an insert in the form of a rotatable clamp bushing. Sets of blades or wear pads are positioned on both an internal surface of the pocket and the external surface of the clamp bushing and cooperate to form sealable chambers that extend about the circumference of the clamp bushing. These chambers are in fluid communication with suitable processor-controlled valves and hydraulic or pneumatic pumps that operate to purge and inject fluid from and into the chambers. Pressurized fluid acting within selected chambers causes rotation of the clamp bushing. The insert also contains a row of teeth arranged to selectively engage corresponding teeth in a tie-bar. The clamp bushing is hence independently rotatable from its surrounding body that, in use, is mechanically attached to an injection molding machine.

SUMMARY

According to a first aspect of the present invention, there is provided a molding-system clamp, including: (i) a lock, (ii) a lock actuator, and (iii) a connecting rod connecting the lock actuator to the lock.

According to a second aspect of the present invention, there is provided a molding-system clamp, including: (i) a piston being configured to impart a clamping force, (ii) a lock being configured to lock the piston to a molding-system rod, (iii) a lock actuator, and (iv) a connecting rod connecting the lock actuator to the lock.

According to a third aspect of the present invention, there is provided a molding-system clamp, including: (i) a piston being configured to impart a clamping force, (ii) a lock being configured to lock the piston to a molding-system rod, (iii) a lock actuator, and (iv) a connecting rod connecting the lock actuator to the lock, responsive to the lock actuator moving the connecting rod, the connecting rod urges the lock in a manner such that the piston becomes locked to the molding-system rod, and the piston may then be actuated so as to impart the clamping force to the molding-system rod.

According to a fourth aspect of the present invention, there is provided a molding system having the molding-system clamp as described above.

According to a fifth aspect of the present invention, there is provided a molded article manufactured by usage of a molding system having the molding-system clamp as described above.

A technical effect, amongst other technical effects, of the aspects of the present invention is improved operation, reduced down-time and/or improved maintenance of molding systems.

DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which.

Figure 1:
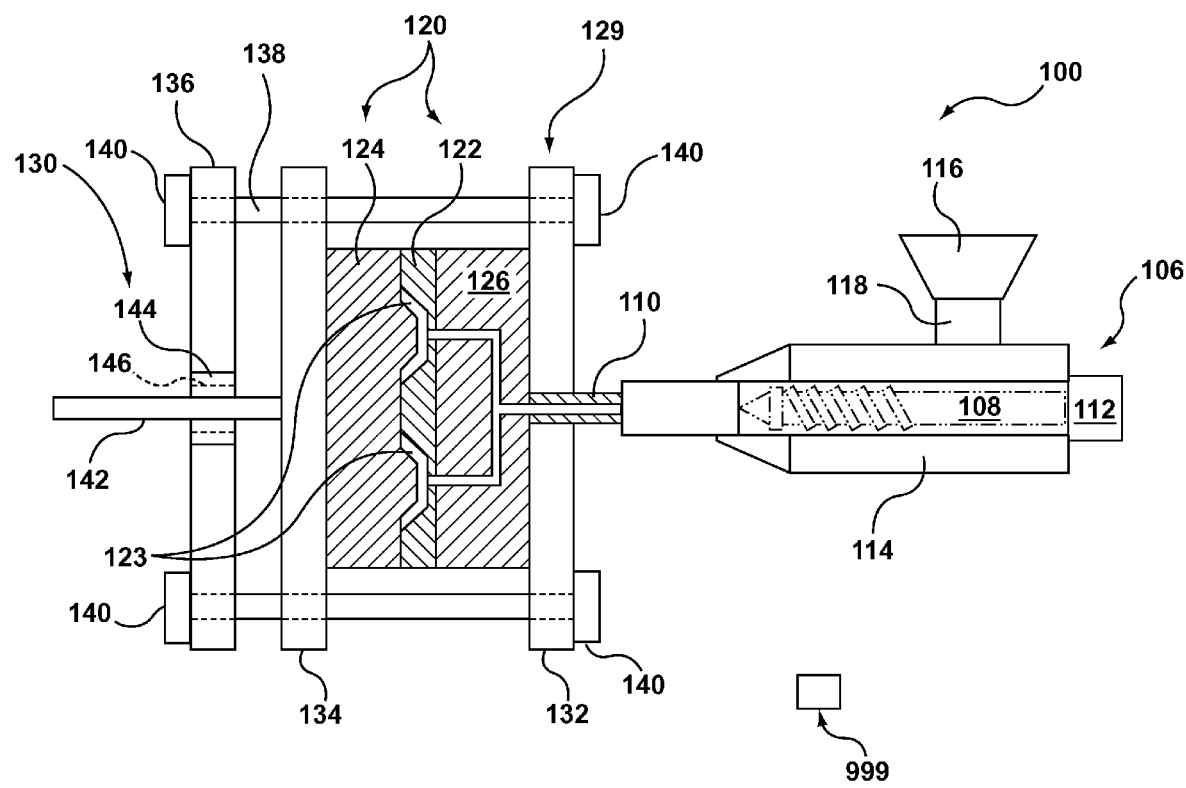
FIG. 1 depicts a schematic representation of a molding system 100 according to a first non-limiting embodiment.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

REFERENCE NUMERALS USED IN THE DRAWINGS

The following is a listing of the elements designated to each reference numeral used in the drawings:

| | |
|---|---|
| molding system, 100 | extruder, 106 |
| screw, 108 | machine nozzle, 110 |
| connections, 111 | screw actuator, 112 |
| barrel assembly, 114 | hopper, 116 |
| feed throat, 118 | platen-stroke actuator, 119 |
| mold assembly, 120 | rows of interrupted teeth, 121 |

-continued

| | |
|---|---|
| stationary mold portion, 122 | mold cavity, 123 |
| movable mold portion, 124 | hot runner, 126 |
| groove, 127 | clamp assembly, 129 |
| molding-system clamp actuator, 130 | pin hole, 131 |
| first platen, 132 | clamp cylinder, 133 |
| second platen, 134 | platen lift hole, 135 |
| third platen, 136 | rod passageway, 137 |
| molding-system rod, 138 | actuator mount, 139 |
| lock nuts, 140 | rod head, 141 |
| molding-system rod, 142 | collar, 143 |
| piston, 144 | piston passageway, 145 |
| lock, 146 | body, 147 |
| bearings, 148A 148B | void, 149 |
| connecting rod, 150 | guide, 151 |
| guide hole, 152 | shaft, 153 |
| passage, 154 | connection, 155 |
| bearings, 156A 156B | mounting holes, 159 |
| lock actuator, 160 | electric motor, 161 |
| position sensor mount, 162 | position sensor, 163 |
| rod pin holder, 169 | front cap, 170 |
| pivot, 171 | piston support, 172 |
| translational displacement, 173 | rotational displacement, 175 |
| stroke actuator, 176 | belt, 178 |
| rod, 179 | rows of interrupted teeth, 181 |
| bore side, 182 | rod side, 183 |
| cam, 184 | mount pad, 185 |
| bearing, 186 | groove, 187 |
| complementary lock member, 188 | belt-mounting portion, 189 |
| lock member, 190 | lock thread, 191 |
| belt, 192 | oil chamber, 193 |
| front cap, 194 | fasteners, 195 |
| ground, 197 | bore side, 198 |
| rod side, 199 | molding system, 200 |
| clamp assembly, 229 | molding system, 300 |
| clamp assembly, 329 | molded article, 999 |

DETAILED DESCRIPTION OF THE NON-LIMITING EMBODIMENTS

FIG. 1 depicts the schematic representation of the molding system 100 according to the first non-limiting embodiment. The molding system 100 may be an injection molding system. A molded article 999 may be manufactured by usage of the molding system 100. The molding system 100 includes some known components that are known to persons skilled in the art and the known components will not be described here; however, the known components are described, at least in part, in the following text books (by way of example): (i) *Injection Molding Handbook* by Osswald/Turng/Gramann (ISBN: 3-446-21669-2; publisher: Hanser), (ii) *Injection Molding Handbook* by Rosato and Rosato (ISBN: 0-412-99381-3; publisher: Chapman & Hill), and/or (iii) *Injection Molding Systems* 3$^{rd}$ Edition by Johannaber (ISBN 3-446-17733-7). The molding system 100 includes (amongst other things) a clamp assembly 129 that includes (i) a first platen 132, (ii) a second platen 134, (iii) a third platen 136, (iv) rods 138, and (v) a molding-system clamp 130 (hereafter referred to as the "clamp 130"). The first platen 132 may be called a stationary platen that is configured to be stationary relative to the second platen 134 and the third platen 136. The second platen 134 may be called a movable platen that is configured to be: (i) translatable or movable between the first platen 132 and the third platen 136, and (ii) selectively lockably positionable at a position located between the first platen 132 and the third platen 136. The third platen 136 may be called a clamp platen that is configured to be stationary relative to the first platen 132 and the second platen 134. The clamp 130 is supported by the third platen 136; specifically, the clamp 130 is supported at a central position or a central region of the third platen 136. Molding-system rods 138 (hereafter referred to as the "rods 138", which are also called tie bars) are connected to and extend from respective corners of the first platen 132 toward respective corners of the second platen 134. The second platen 134 is slidable relative to the rods 138 so that the second platen 134 may move without interfering with the rods 138; this arrangement of non-interference may be achieved, for example, by: (i) the rods 138 may extend through the second platen 134 via rod-accommodation passageways defined in the second platen 134, or alternatively (ii) the second platen 134 may define notches that do not interfere with the rods 138. The rods 138 are connected to respective corners of the third platen 136. Lock nuts 140 (which are also called tie-bar nuts) attach the rods 138 to: (i) the respective corners of the first platen 132, and (ii) the respective corners of the third platen 136. Once the clamp 130 is actuated, a clamping force is applied so as to: (i) push the central region of the second platen 134 toward the first platen 132, and (ii) pull the rods 138 toward the third platen 136 (so that the rods 138 become stretched), so that in effect the clamping force may become applied across the first platen 132 and the second platen 134 so as to squeeze the mold assembly 120 together as the mold cavities 123 are filled (under pressure) with a moldable molding material. The manner in which the mold cavities 123 are filled under pressure is described further below. It will be appreciated that once the clamping force is applied by the clamp 130: (i) the rods 138 may become stretched by a small degree, and (ii) the third platen 136 may experience some movement relative to the first platen 132 (that is, the third platen 136 is not altogether stationary, but it is substantially stationary).

According to a first non-limiting variant (depicted in FIG. 1) of the first non-limiting embodiment, the first platen 132 and the second platen 134 are configured to supportably retain molding tools, such as: (i) a hot runner 126, and (ii) a mold assembly 120 that is coupled to the hot runner 126. The molding tools are items that typically wear quickly over time (relative to the wear experienced by the clamp assembly 129), and such the molding tools are sold separately from the clamp assembly 129. Specifically, the hot runner 126 is: (i) attached to the first platen 132, and (ii) oriented toward the second platen 134. The mold assembly 120 includes: (i) a stationary mold portion 122, and (ii) a movable mold portion 124. The stationary mold portion 122 is: (i) attached to the hot runner 126, and (ii) oriented toward the second platen 134. The movable mold portion 124 is: (i) attached to the second platen 134, and (ii) oriented toward the stationary mold portion 122 so that once the first platen 132 and the second platen 134 are stroked together, the stationary mold portion 122 and the movable mold portion 124 may be closed together so as to define at least one or more mold cavities 123, from which the molded article 999 may be formed. Once the first platen 132 and the second platen 134 are stroked apart, the molded article 999 may be removed from the mold cavity 123, either: (i) manually removed, or (ii) more preferably removed by a robot (not depicted) if reduction in the cycle time of the molding system 100 is an important consideration. The mechanism for stroking the second platen 134 is described with respect to FIG. 8B. According to a second non-limiting variant (not depicted) of the first non-limiting embodiment, the first platen 132 and the second platen 134 are configured to supportably retain the mold assembly 120, and the hot runner 126 is not included. Sometimes the hot runner 126 is not included because the stationary mold portion 122 and the movable mold portion 124 define only one mold cavity and thus only one mold gate leads into the mold cavity; however, there are instances of when a hot runner 126 may be used to feed or convey the injectable molding material into a plurality of mold gates (that is, a plurality of entrances that lead into a single mold cavity). Specifically, the stationary mold portion 122 is: (i) attached to the first platen 132, and (ii) oriented toward the second platen 134. The movable mold portion 124 is: (i) attached to the second platen 134, and (ii) oriented toward the stationary mold portion 122.

The molding system 100 may, according to a variant, further include an extruder 106. Generally, the extruder 106 is configured to: (i) receive a moldable molding material, (ii) convert the moldable molding material into an injectable molding material, and (iii) inject, under pressure, the injectable molding material directly into one of operational cases (A), (B), or (C). According to operational case (A), which is depicted in FIG. 1, the hot runner 126 is configured to: (i) receive the injectable molding material from the extruder 106, and (ii) then convey the injectable molding material into a plurality of mold cavities 123 of the mold assembly 120. According to operational case (B), which is not depicted, a single mold cavity 123 of the mold assembly 120 has a single mold gate that needs to be filled, and the hot runner 126 is not used, and the extruder 106 injects the injectable molding material into the mold cavities 123. According to operational case (C), which is not depicted, a single mold cavity 123 of the mold assembly 120 has a plurality of mold gates that need to be filled, and the hot runner 126 is used. The extruder 106 may be (for example): (i) a reciprocating-screw (RS) extruder (which is depicted in FIG. 1), or (ii) a two-stage extruder (not depicted) that has a shooting-pot configuration. Both types of extruders permit achieving the functional objective of filling the mold cavities of the mold assembly 120. The extruder 106 (as depicted in FIG. 1) includes: (i) a hopper 116, (ii) a feed throat 118, (iii) a barrel assembly 114, (iv) a screw 108, (v) a screw actuator 112, and (vi) a machine nozzle 110. The hopper 116 is configured to receive the moldable molding material, which may be, for example, either pellets of plastic or pellets of metal. The feed throat 118 is coupled to the hopper 116 so as to receive the moldable molding material from the hopper 116. The barrel assembly 114 defines a passageway that communicates with the feed throat 118 so as to receive the moldable molding material from the hopper 116. The screw 108 is axially, slidably movable along the passageway of the barrel assembly 114. The machine nozzle 110 is coupled to an exit port of the barrel assembly 114, and either conveys the injectable molding material directly to: (i) the hot runner 126 (as depicted in FIG. 1), or (ii) the mold cavities 123 via other structures, such as a hot sprue (not depicted), etc. The screw actuator 112 is configured to: (i) be coupled to the screw 108, (ii) rotate the screw 108 so as to convert the moldable molding material that is held in the passageway of the barrel assembly 114 into the injectable molding material, and (iii) to translate (under pressure), with the assistance of a check valve (not depicted) the injectable molding material into the machine nozzle 110, through the hot runner 126, and then into the mold cavities 123 (as depicted in FIG. 1). The check valve is configured to: (i) be connected to the distal end of the screw 108 that is located proximate to the machine nozzle 110, (ii) substantially prevent back flow of the injectable molding material toward the feed throat 118, and (iii) assist in the transport of the injectable molding material toward the mold cavity 123. Sometimes, the mold assembly 120, the hot runner 126, the extruder 106, and the clamp assembly 129 are sold or supplied separately by several vendors; however, in some instances, the mold assembly 120, the hot runner 126, the extruder 106 and the clamp assembly 129 are all sold combined by a single vendor.

Figure 4:
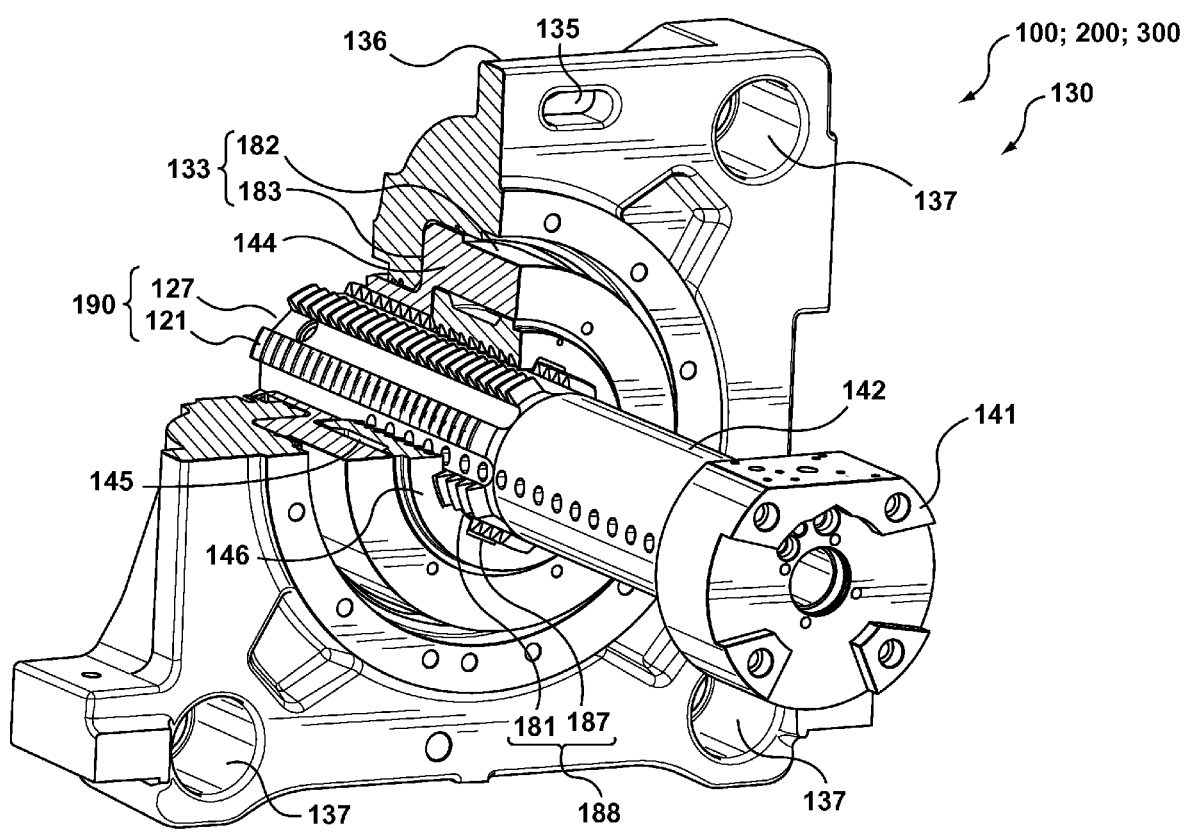
FIGS. 4 and 5 depict perspective views of a molding-system clamp 130 of FIG. 1.

The clamp 130 includes: (i) a molding-system rod 142 (hereafter referred to as the "rod 142", which is also called a clamp rod), (ii) a piston 144, and (iii) a lock 146. An end of the rod 142 is attached to a back side of the second platen 134. The piston 144 is hydraulically movable between a force-application position (in which the clamp force may be applied by the clamp 130) and a force-off position (in which the clamp force is not applied by the clamp 130). The piston 144 defines a piston passageway 145 (which is depicted in FIG. 4) so that the rod 142 may be slidably received in the piston passageway 145 of the piston 144. The lock 146 is rotatably mounted in the piston passageway 145. The lock 146 is positioned between the rod 142 and the piston 144. The lock 146 is configured to lock and unlock the rod 142 with the piston 144. In operation, (i) the second platen 134 is stroked toward the first platen 132 (by using stroke cylinders; not depicted) so that the mold assembly 120 is closed and form the mold cavities 123 (as depicted in FIG. 1), (ii) the lock 146 is made to lockably engage the rod 142 with the piston 144, (iii) the piston 144 is hydraulically engaged or actuated so that the clamp force may then be applied to the rod 142. The clamping force is transferred to: (i) the rod 142 that in turn pushes or urges the second platen 134 toward the first platen 132, and (ii) the rods 138 become stretched so as to pull the third platen 136 toward the first platen 132, so that in effect the clamping force acts to squeeze the mold assembly 120 together as the mold cavities 123 are injected, under pressure, with the injectable moldable molding material from the extruder 106. The extruder 106 injects, under pressure, the injectable molding material into the mold cavities 123 either: (I) directly via the machine nozzle 110 into the mold assembly 120 via some simplified structures (such as a sprue, which is not depicted) so that the hot runner 126 is not required or used, or (II) directly via the machine nozzle 110 into the hot runner 126 which then conveys the material to the mold assembly 120.

Figure 2:
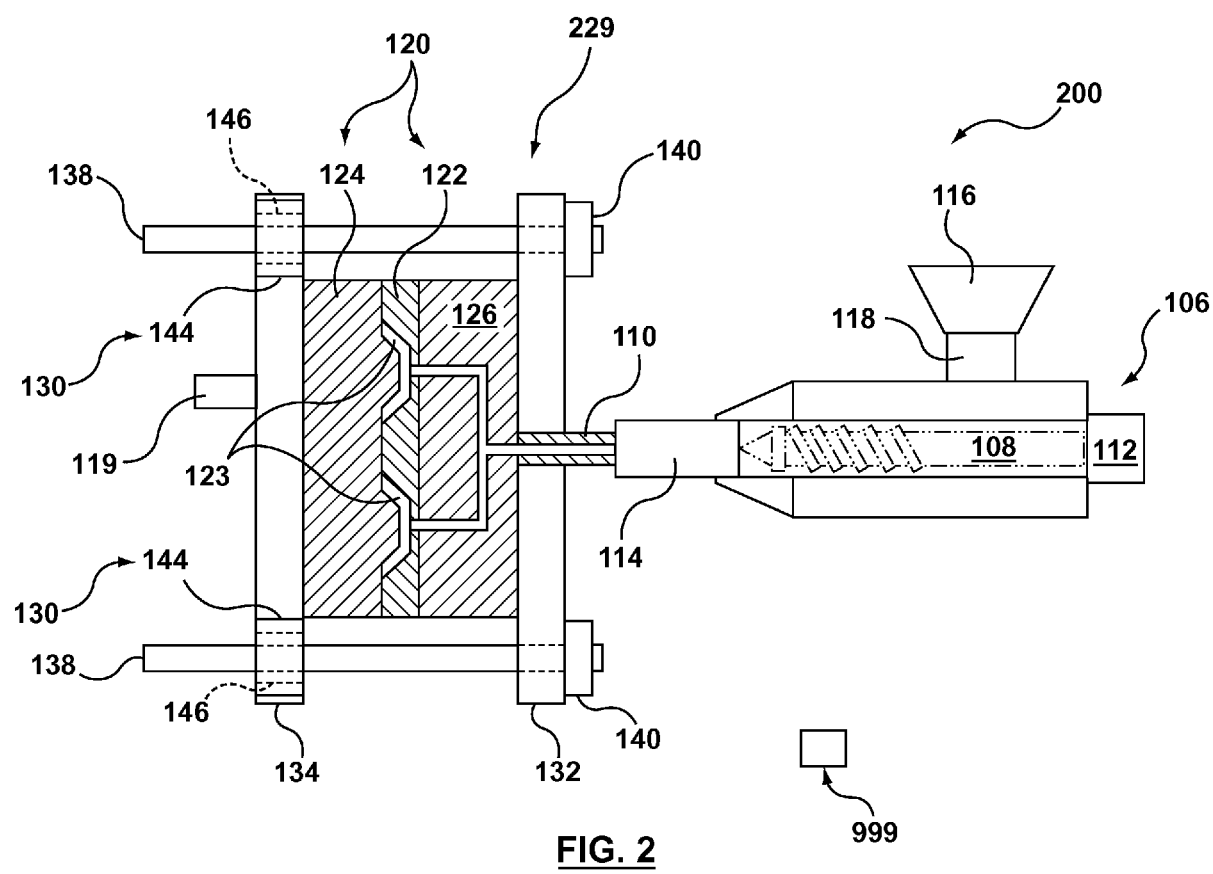
FIG. 2 depicts a schematic representation of a molding system 200 according to a second non-limiting embodiment.

FIG. 2 depicts the schematic representation of the molding system 200 according to the second non-limiting embodiment. The molding system 200 may be an injection molding system. The molding system 200 shares some components with molding system 100; however, the differences between the molding system 200 and the molding system 100 are described below. The molded article 999 may be manufactured by usage of the molding system 200. According to the molding system 200, the third platen 136 (depicted in FIG. 1) is not used. The molding system 200 has a clamp assembly 229 that includes: (i) the first platen 132, (ii) the second platen 134, and (iii) clamps 130 (that is, a set of clamps 130). Each of the clamps 130 depicted in FIG. 2 is similar to the clamp 130 depicted in FIG. 1. The clamp unit 130 in the first non-limiting embodiment has its teeth oriented so that actuation of the clamp piston pushes the clamp piston against the central column (flat side of the teeth engaged). In the second non-limiting embodiment, the teeth are reversed because actuation of the clamp piston pulls the rod (again flat side of teeth are engaged). The second platen 134 is: (i) movable relative to the first platen 132, and (ii) lockably positionable relative to the first platen 132. The rods 138 extend from respective corners of the first platen 132 to respective corners of the second platen 134. The lock nuts 140 attach the rods 138 to the corners of the first platen 132. The second platen 134 accommodates (supports) the clamps 130 at respective corners of the second platen 134. Each of the clamps 130 includes a respective piston 144 and a respective lock 146. A selected rod 138 is receivable in a respective (or selected one) of the piston passageway defined by a respective piston 144. A selected lock 146 is positioned between the rod 138 and the piston 144. Each lock 146 is configured to lockably engage and disengage the rod 138 with the piston 144. The lock 146 is rotatably mounted in the piston passageway of the piston 144. The piston 144, in use, applies the clamp force to the rod 138 after: (i) the lock 146 is made to lockably engage the rod 138 with the piston 144, and (ii) the piston 144 is hydraulically moved or actuated. According to a first non-limiting variant (depicted in FIG. 2) of the second non-limiting embodiment, the first platen 132 and the second platen 134 are configured to supportably retain or support the mold tool (which is, specifically, the mold assembly 120 and the hot runner 126); more specifically, (i) the hot runner 126 is coupled to the first platen 132 and is oriented toward the second platen 134, (ii) the stationary mold portion 122 is coupled to the hot runner 126 and is oriented toward the second platen 134, and (iii) the movable mold portion 124 is coupled to the second platen 134 and is oriented toward the stationary mold portion 122. According to a second non-limiting variant (not depicted) of the second non-limiting embodiment, the first platen 132 and the second platen 134 are configured to supportably retain the mold assembly 120, and the hot runner 126 is not included in this variant; more specifically, (i) the stationary mold portion 122 is mounted to or supported by the first platen 132, and (ii) the movable mold portion 124 is mounted to or supported by the second platen 134. A platen-stroke actuator 119 is used to stroke the second platen 134.

Figure 3:
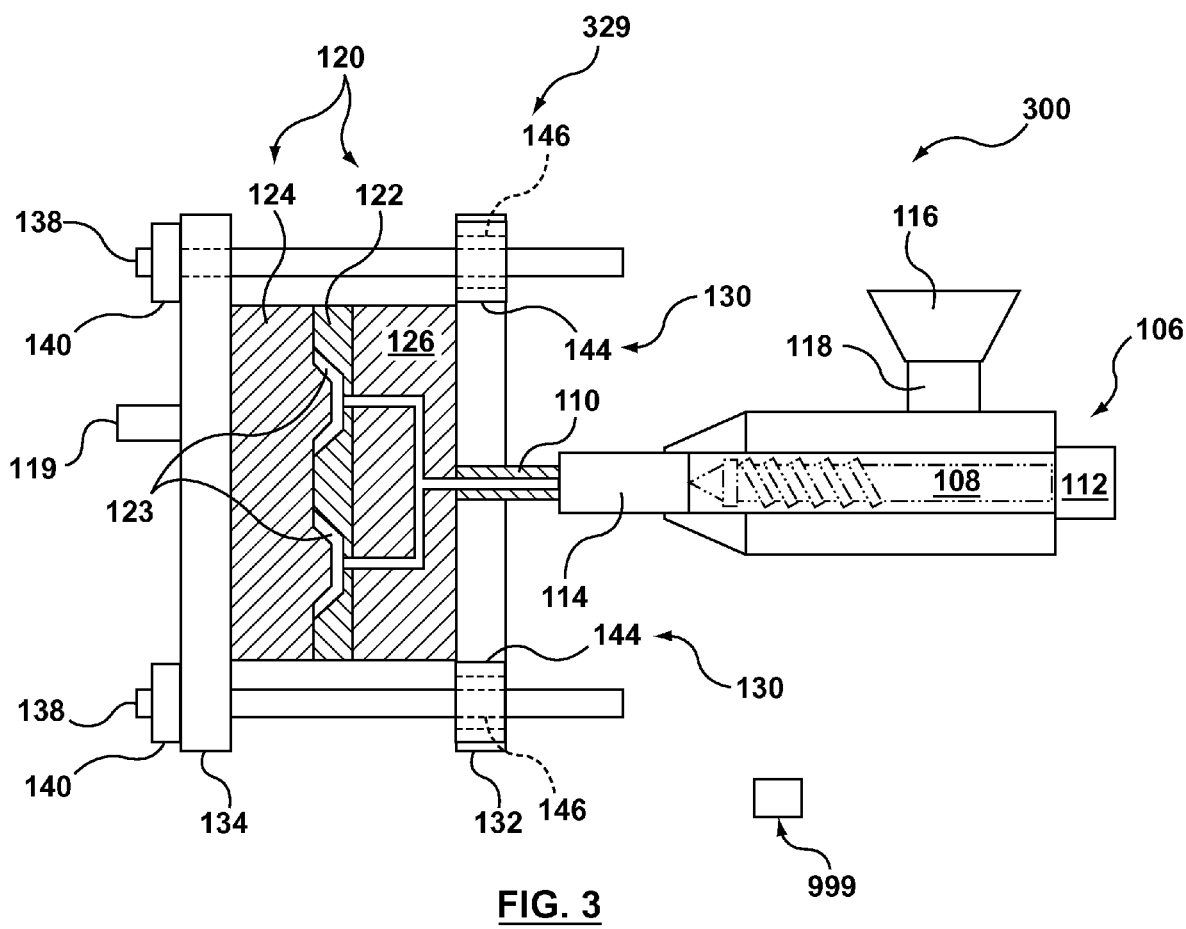
FIG. 3 depicts a schematic representation of a molding system 300 according to a third non-limiting embodiment.

FIG. 3 depicts the schematic representation of the molding system 300 according to the third non-limiting embodiment. The molding system 300 may be an injection molding system. The molding system 300 shares some components with molding system 100; however, the differences between the molding system 300 and the molding system 100 are described below. According to the molding system 300, the third platen 136 (depicted in FIG. 1) is not used. The molded article 999 may be manufactured by usage of the molding system 300. The molding system 300 includes a clamp assembly 329 that includes: (i) the first platen 132, (ii) the second platen 134, and (iii) the clamps 130. Each of the clamps 130 depicted in FIG. 3 is similar to the clamp 130 depicted in FIG. 2. The rods 138 extend from respective corners of the first platen 132 to respective corners of the second platen 134. The second platen 134 includes rod-accommodation holes that receive the rods 138. Lock nuts 140 attach the rods 138 to respective corners of the second platen 134. The clamps 130 are supported at respective corners of the first platen 132. Each of the clamps 130 include: (i) the piston 144, and (ii) a lock 146. The rod 138 is receivable in the piston passageway defined by the piston 144. The lock 146 is positioned between the rod 138 and the piston 144. The lock 146 is configured to lockably engage and disengage the rod 138 with the piston 144. The lock 146 is rotatably mounted in the piston passageway of the piston 144. The piston 144, in use, applies the clamp force to the rod 138 once the piston 144 is hydraulically moved or actuated. According to a first non-limiting variant (depicted in FIG. 3) of the second non-limiting embodiment, the first platen 132 and the second platen 134 are configured to supportably retain: (i) the mold assembly 120, and (ii) the hot runner 126; more specifically: (i) the hot runner 126 is coupled or attached to the first platen 132 and is oriented to face the second platen 134, (ii) the stationary mold portion 122 is attached to the hot runner 126 and is oriented to face the second platen 134, and (iii) the movable mold portion 124 is mounted to the second platen 134 and is oriented to face the movable mold portion 124. According to a second non-limiting variant (not depicted) of the second non-limiting embodiment, the first platen 132 and the second platen 134 are configured to supportably retain the mold assembly 120, and the hot runner 126 is not included in this variant; more specifically: (A) the stationary mold portion 122 is coupled or attached to the first platen 132 and is oriented to face the second platen 134, and (B) the movable mold portion 124 is mounted to the second platen 134 and is oriented to face the movable mold portion 124. A platen-stroke actuator 119 is used to stroke the second platen 134.

Figure 5:
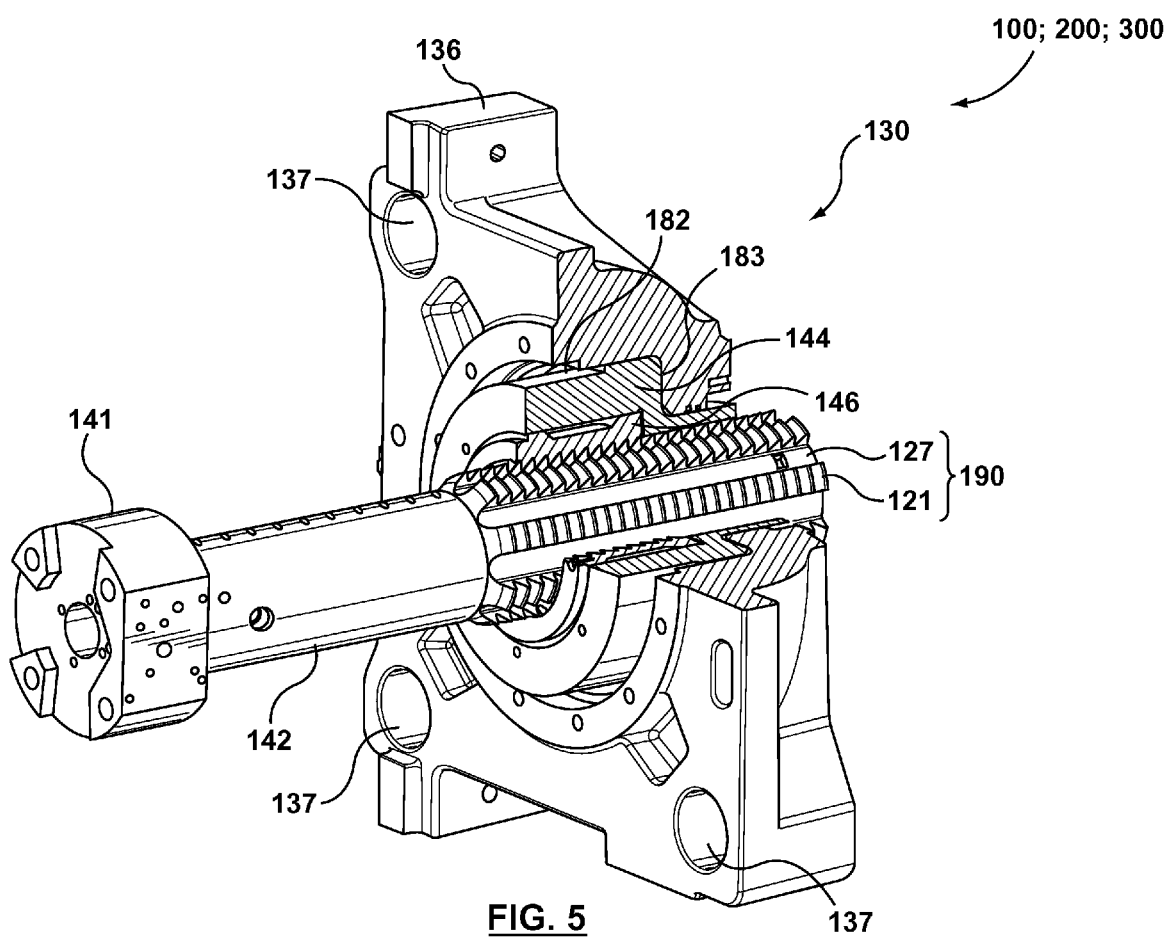

FIGS. 4 and 5 depict the partial perspective views of the clamp 130 of FIG. 1, in which the clamp 130 interacts with the rod 142. According to the non-limiting embodiments depicted in FIGS. 2 and 3, the clamp 130 interacts with the rod 138; however, it will be appreciated that the working principles, structures, and/or functions described with respect to the clamp 130 in association with FIGS. 4 and 5 are applicable to the non-limiting embodiments described in association with FIGS. 2 and 3. The third platen 136 defines: (i) a platen lift hole 135 along an upper perimeter of the third platen 136, and (ii) rod passageways 137 at respective corners of the third platen 136 that are configured to receive respective rods 138 (not depicted in FIGS. 4 and 5 for the sake of clarifying the views of the clamp 130). The rod 142 includes a lock member 190 having: (i) rows of interrupted teeth 121 (sometimes referred to as the "teeth 121") that extend radially outward from an outer circumferential surface of the rod 142, and (ii) a groove 127 (more than one groove may be used) extending through the rows of interrupted teeth 121 axially along the outer surface of the rod 142. The lock 146 defines an internal passageway that extends through the lock 146. The lock 146 includes a complementary lock member 188 that is complementary to the lock member 190. The complementary lock member 188 includes: (i) rows of interrupted teeth 181 (sometimes referred to as the "teeth 181") that extend radially inward from the internal passageway of the lock 146 toward a longitudinal axis that extends through the lock 146, and (ii) a groove 187 (more than one groove may be used) extending through the rows of interrupted teeth 181 axially along the internal passageway of the lock 146. The complementary lock member 188 is interactable with the lock member 190 so that the lock 146 may lockably engage or lockably disengage the piston 144 relative to the rod 142 (or relative to the rod 138 in the case of the non-limiting embodiments depicted in FIGS. 2 and 3). In the unlocked condition (in which the lock 146 does not lock the rod 142 to the piston 144), the rod 142 is free to linearly translate relative to the third platen 136 because: (i) the groove 127 of the lock member 190 of the rod 142 is aligned with (or placed in line with) the rows of interrupted teeth 181 of the complementary lock member 188 of the lock 146, and (ii) the rows of interrupted teeth 121 of the lock member 190 of the rod 142 are aligned with the groove 187 of the complementary lock member 188 of the lock 146 (that is, the teeth 121 are not engaged with the teeth 181). In the locked condition (in which the lock 146 locks the rod 142 relative to the piston 144), the rod 142 does not substantially move relative to the third platen 136 because: (i) the groove 127 of the lock member 190 of the rod 142 is aligned with the groove 187 of the complementary lock member 188 of the lock 146, and (ii) the rows of interrupted teeth 121 of the lock member 190 of the rod 142 are aligned with the rows of interrupted teeth 181 of the complementary lock member 188 of the lock 146 (that is, the teeth 121 are engaged with the teeth 181). The rod 142 does move (somewhat) when the piston 144 is actuated and causes the clamping force to be applied. There is a movement as evidenced by the amount of rod stretch that may be seen. The rod 142 includes a rod head 141 that is configured to: (i) connect the rod 142 to second platen 134, and (ii) transmit the clamp force from the rod 142 to the second platen 134. The piston 144 includes or defines the piston passageway 145 that extends or passes axially through the piston 144. The piston 144 is generally cylindrical in shape, and an interior surface of the piston 144 defines the piston passageway 145. The lock 146 is received within the piston passageway 145. The clamp 130 includes a clamp cylinder 133 that defines: (i) a bore side 182, and (ii) a rod side 183 (both of which are located on opposite sides of the piston 144). Once the lock member 190 and the complementary lock member 188 lockably engage one another, the clamp cylinder 133 may be actuated so as to alternatively apply: (i) the clamp force to the piston 144 when hydraulic force supplied to the rod side 183 exceeds hydraulic force supplied to the bore side 182, and (ii) a mold-break force to the piston 144 when hydraulic force supplied to the bore side 182 exceeds hydraulic force supplied to the rod side 183. After the molded article 999 has been formed in the mold cavity 123, the mold-break force is used to break apart the stationary mold portion 122 and the movable mold portion 124 from each other so that the molded article 999 may be released from the mold cavity 123.

However, according to the clamp 130 of FIGS. 2 and 3, (i) the clamp 130 interacts with the rod 138 (which is also known as the tie bar), (ii) the clamp 130 does not interact with the rod 142 (because the rod 142 is not used in the non-limiting embodiments depicted in FIGS. 2 and 3), and (iii) the rod 138 includes the lock member 190, which is not depicted in the non-limiting embodiments associated with FIGS. 2 and 3; specifically, the lock member 190 includes: (i) the rows of interrupted teeth 121 that extend radially outward from an outer surface of the rod 138, and (ii) the groove 127 (more than one groove may be used) extending through the rows of interrupted teeth 121 axially along the rod 138.

Figures 6A, 6B:
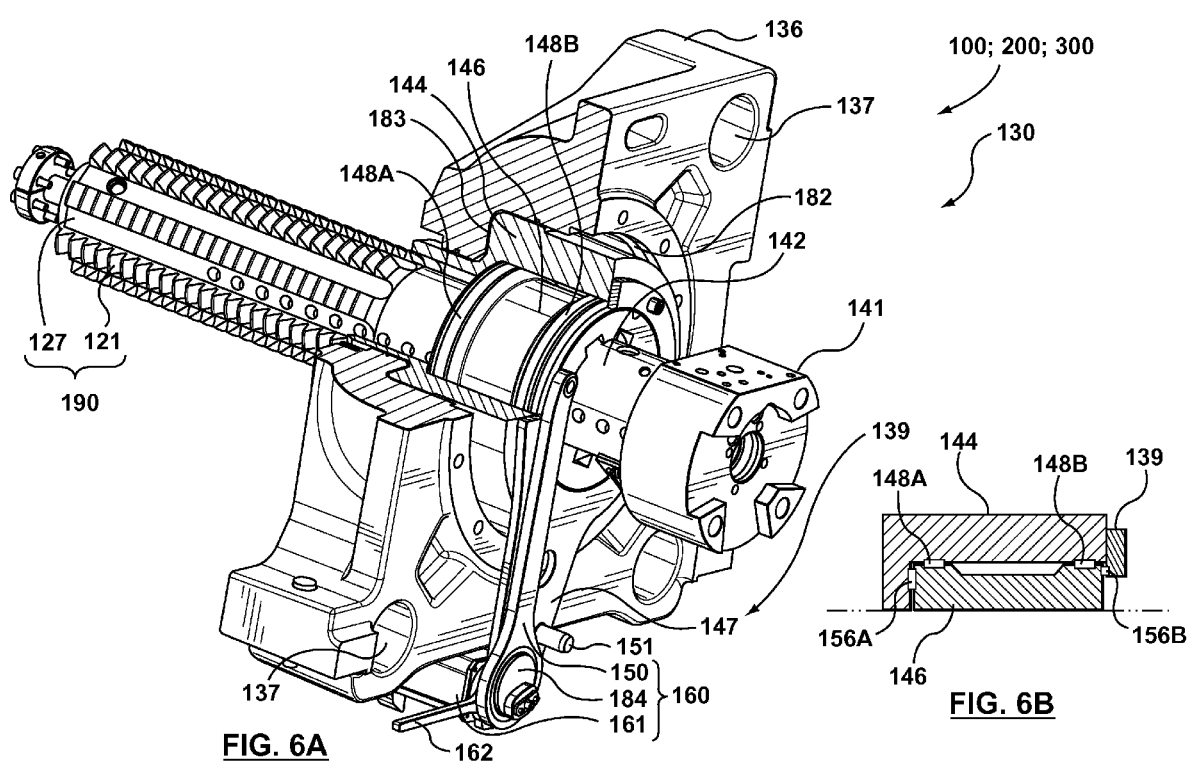
FIG. 6A depicts another perspective view of the molding-system clamp 130 according to a fourth non-limiting embodiment.
FIG. 6B depicts a partial cross-sectional view of the molding-system clamp 130 of FIG. 6A.

FIG. 6A depicts another sectioned perspective view of the clamp 130 of FIGS. 1, 2 and 3 according to the fourth non-limiting embodiment. The clamp 130 includes: (i) a piston 144, (ii) a lock 146, (iii) a lock actuator 160, and (iv) a connecting rod 150. The piston 144 is configured to impart a clamping force. The lock 146 is configured to lock the piston 144 to a molding-system rod 142 (hereafter referred to as the "rod 142"). The connecting rod 150 connects the lock actuator 160 to the lock 146. Responsive to the lock actuator 160 moving the connecting rod 150, the connecting rod 150 urges the lock 146 in a manner such that the piston 144 becomes locked to the molding-system rod 142, and the piston 144 may then be actuated so as to impart the clamping force to the molding-system rod 142. According to a non-limiting variant, the clamp 130 includes: (i) an actuator mount 139, and (ii) a lock actuator 160. The actuator mount 139 includes a body 147. The body 147 is configured to: (i) be fixedly positioned relative to the piston 144, (ii) support the lock actuator 160, and (iii) accommodate movement of the lock actuator 160 relative to the piston 144. The lock actuator 160 includes: (i) a guide 151, (ii) a connecting rod 150, (iii) a cam 184 (described in detail in association with FIG. 10), and (iv) an electric motor 161 (described in detail in association with FIG. 10). As depicted in FIG. 6A, the connecting rod 150 is of the one-plane-of-rotation type rod, in that the connecting rod 150 operates in a single plane of motion. According to a variant (not depicted), the connecting rod 150 is of the swivel-type rod so that the lock actuator 160 may be, for example, mounted to a platen 136 (that is, the connecting rod 150 operates in a three dimensional axis of motion in sharp contrast to the two-dimensional or the single plane of motion).

The lock actuator 160 is configured to actuate (that is, to put into action, motion or movement) the lock 146 between: (i) a locked condition (so that the lock 146 is locked to the rod 142), and (ii) an unlocked condition (so that the lock 146 is not locked to the rod 142). The connecting rod 150 is: (i) pivotally attached to the lock 146 (specifically, to the outer axial face of the lock 146), and (ii) coupled to the lock actuator 160 so that the lock actuator 160 may move the connecting rod 150 so that the lock 146 may be moved to lock and unlock the piston 144 to the rod 142. The connecting rod 150 may be included as part of the lock actuator 160 or part of the actuator mount 139. According to a non-limiting variant (as depicted in FIG. 6A), the actuator mount 139 includes a position sensor mount 162 that is configured to: (i) support a position sensor (not depicted), (ii) extend from the body 147 along a radial direction relative to the lock 146, and (iii) move with the body 147 so that the position sensor may indicate axial position and/or rotational position of the piston 144. According to another non-limiting variant, the actuator mount 139 includes the guide 151 that is, preferably, fastened to the third platen 136 (but it is not necessary to attached the guide 151 to the third platen 136). The guide 151 is configured to: (i) guide translation of the actuator mount 139, and (ii) prevent rotation of the actuator mount 139 as the actuator mount 139 is made to be translated between a clamp-force-off position and a clamp-force-on position (alternatively, the guide 151 may be included in the lock actuator 160), and the body 147 defines a guide hole 152 (better depicted in FIG. 11) that is configured to slidably receive the guide 151.

FIG. 6B depicts the partial cross-sectional view of the clamp 130 of FIG. 6A from above a center line that extends through the clamp 130. The lock 146 is received in the piston 144. Bearings 148A, 148B (radial-type bearings) are: (i) located on an outer-facing radial surface of the lock 146, and (ii) used to constrict radial movement of the lock 146 so that the lock 146 may be rotated within the piston 144. The bearings 148A, 148B are configured to be positioned about the curved, outer face of the lock 146 so as to permit rotational movement of the lock 146 with respect to the piston 144. Bearings 156A, 156B (thrust-type bearings) are: (i) located on outer-facing axial surfaces located on opposite sides of the lock 146, and (ii) used to constrict axial movement of the lock 146 so that the lock 146 may not translate axially relative to the piston 144 (that is, the bearings 156A, 156B permit the piston 144 and the lock 146 to linearly translate together along a common longitudinal axis that extends through the lock 146).

Figure 7:
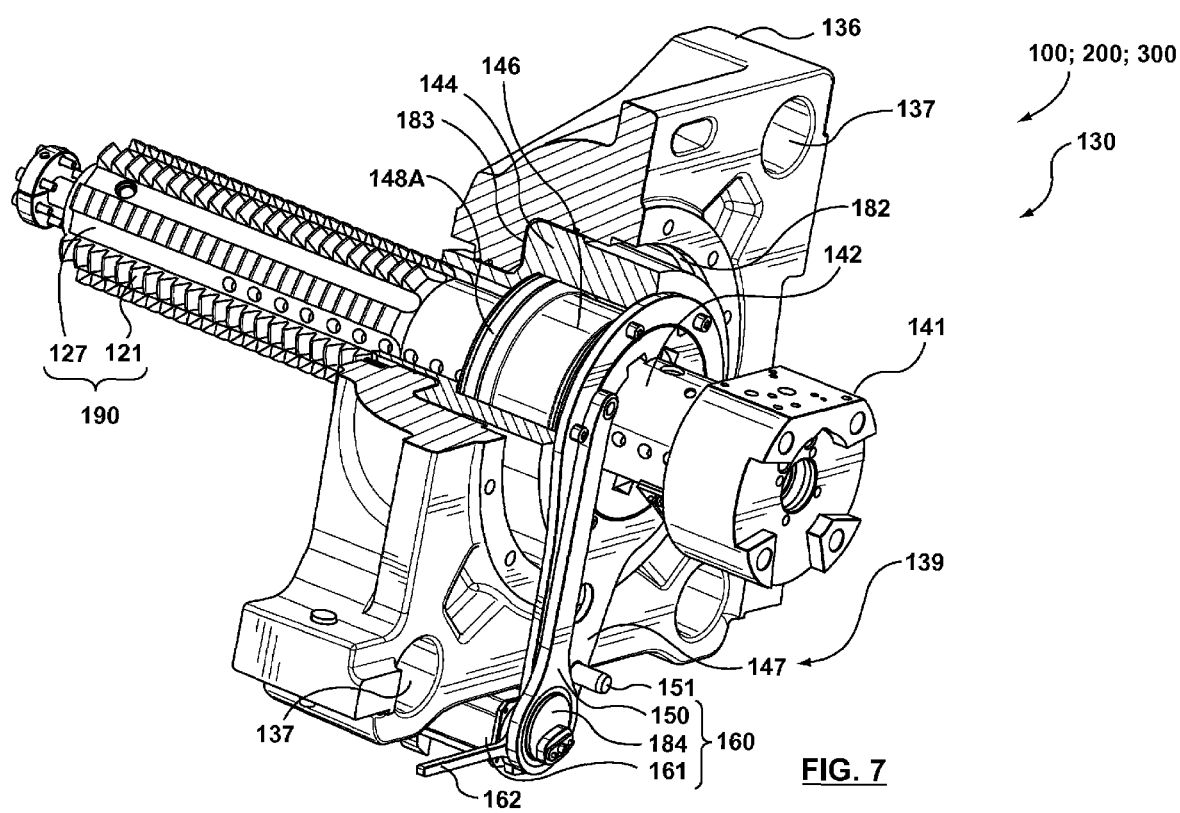
FIG. 7 depicts yet another perspective view of the molding-system clamp 130 of FIG. 6A.

FIG. 7 depicts yet another perspective view of the clamp 130 of FIG. 6A. In this view, the body 147 of the actuator mount 139 is depicted (in an outside view) attached to the face edge of the piston 144.

Figures 8A, 8B:
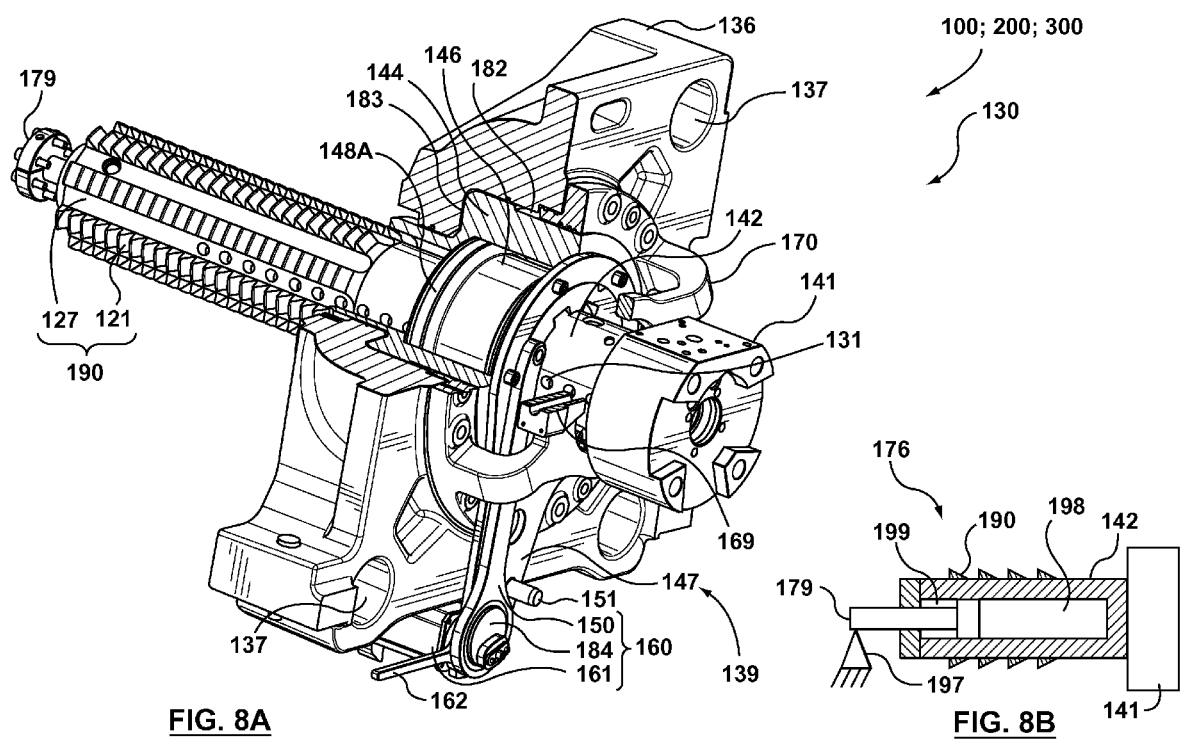
FIG. 8A depicts yet another perspective view of the molding-system clamp 130 of FIG. 6A.
FIG. 8B depicts a partial cross-sectional view of the molding-system clamp 130 of FIG. 6A.

FIG. 8A depicts yet another sectioned perspective view of the clamp 130 of FIG. 6A. A front cap 170 is configured to: (i) be fastened to the third platen 136, (ii) be positioned between the rod head 141 and the third platen 136, (iii) encircle the piston 144, (iv) prevent the rod head 141 from abutting against the lock 146 and the piston 144, (v) define, in part, the bore side 182 of clamp cylinder 133, and (vi) include a rod pin holder 169 which is configured to hold a pin (not depicted) that is slidable into a pin hole 131 defined in the outer surface of the rod 142. A pin actuator (not depicted) is used to move the pin. The pin is a safety feature and may be used if it is desired to lock-out operation of the molding systems 100, 200 or 300 (for example, when maintenance is performed, etc). If the pin is moved into the pin hole 131, the rod 142 is then placed in a rod-locked condition (that is, the pin prevents movement of the rod 142), in which case the clamp force may not be transmitted from the rod 142 to the second platen 134 (not depicted in FIG. 8A). If the pin is moved out from the pin hole 131, the rod 142 is then placed in an rod-unlocked condition, in which the clamp force may be transmitted from the rod 142 to the second platen 134. The pin is a safety interlock that prevents: (i) transmission of the clamp force from the rod 142 to the second platen 134, or (ii) movement of the second platen 134.

FIG. 8B depicts the partial schematic cross-sectional view of the clamp 130 of FIG. 6A. The following description is applicable to the non-limiting embodiment depicted in FIG. 1, and is not applicable to the non-limiting embodiments depicted in FIGS. 2 and 3. The rod 142 defines an internal chamber that is sized to slidably receive a stroke actuator 176. The stroke actuator 176 is used to translate the rod 142 (and the second platen 134 which is connected to the rod 142) between: (i) a mold-opened position in which the stationary mold portion 122 and the movable mold portion 124 are separated from each other, and (ii) a mold-closed position, in which the stationary mold portion 122 and the movable mold portion 124 abut each other. The internal chamber in combination with the stroke actuator 176 defines: (i) a bore side 198, and (ii) a rod side 199. A hydraulic circuit (not depicted) is coupled to the bore side 198 and the rod side 199 so as to communicate a hydraulic fluid. The stroke rod 179 has: (i) a first end situated within a hollow portion of rod 142, and (ii) a second end which is connected to ground 197. Preferably, the second end is connected to the rear side of the third platen 136 via piston support 172. In operation: (i) when it is desired to stroke the second platen 134 toward the first platen 132, the bore side 198 is pressurized while rod side 199 is unpressurized, and (ii) when it is desired to stroke the second platen 134 away from the first platen 132, the bore side 198 is depressurized while the rod side 199 is pressurized.

Figure 9:
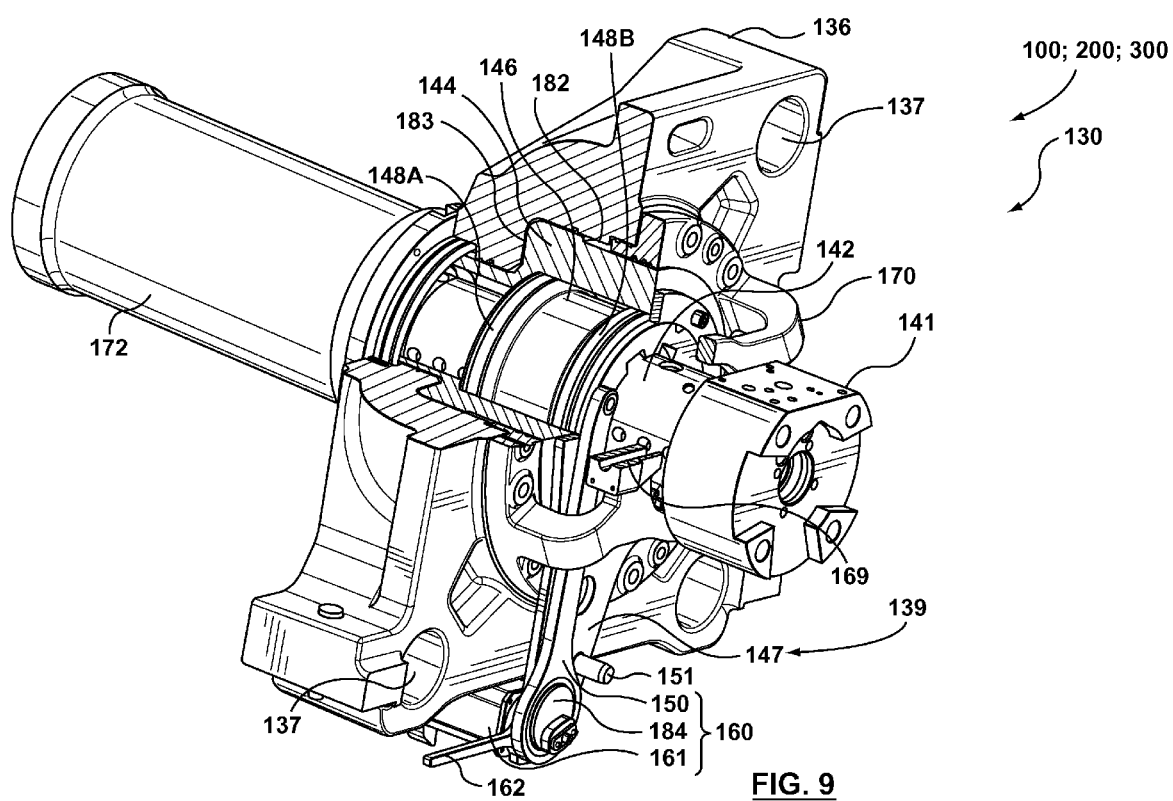
FIG. 9 depicts yet another perspective view of the molding-system clamp 130 of FIG. 6A.

FIG. 9 depicts yet another sectioned perspective view of the clamp 130 of FIG. 6A. A piston support 172 is used to cover a distal end of the rod 142. A piston support 172 is fixedly attached to the rearward-facing side of the third platen 136. The piston support 172 shields portions of the rod 142 and the stroke rod 179, which both extend behind the third platen 136. The stroke rod 179, being fastened to the distal end of the piston support 172, is held fixed in space relative to the piston support 172.

Figure 10:
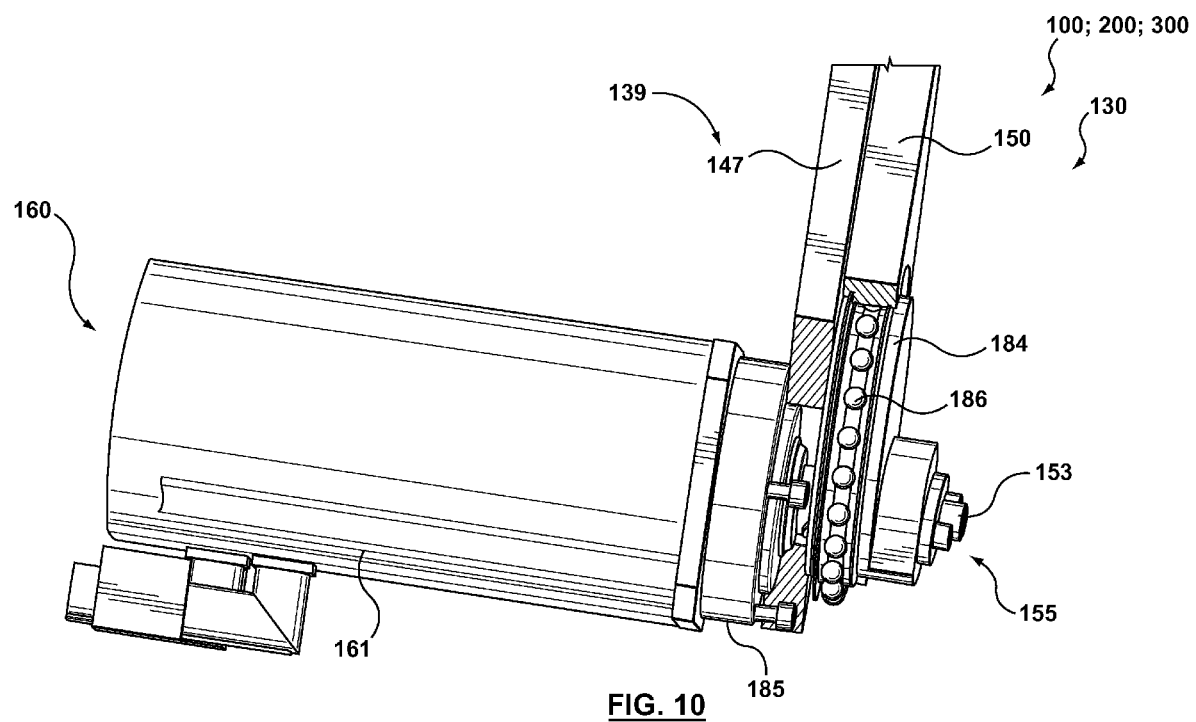
FIG. 10 depicts a partial perspective view of the molding-system clamp 130 of FIG. 6A.

FIG. 10 depicts the partial perspective view of the clamp 130 of FIG. 6A. The lock actuator 160 includes: (i) the electric motor 161, (ii) the cam 184, and (iii) the connecting rod 150. The electric motor 161 has a shaft 153 that is configured to be rotatably driven responsive to actuation (or activation) of the electric motor 161. The body 147 defines a channel that receives and supports the shaft 153 of the electric motor 161. The cam 184 is: (i) connected to the shaft 153, and (ii) has a center of mass that is positioned offset from the shaft 153 so that the cam 184 may be eccentrically rotated once the shaft 153 is made to rotate. The connecting rod 150 is: (i) rotatably mounted to and supported by the cam 184 (by a bearing 186), and (ii) pivotally connected to the lock 146. The body 147, while supporting the shaft 153, also supports the electric motor 161 by means of a mount pad 185 that is situated between the electric motor 161 and the body 147. The mount pad 185 fixedly connects the body 147 with the electric motor 161 (via bolts). The bearing 186 (a radial-type bearing) is: (i) located between the connecting rod 150 and the cam 184, and (ii) used to allow: (i) rotational movement of the shaft 153 and of the cam 184 so that translational (reciprocating) movement of the connecting rod 150 may be achieved. The rotational movement of the shaft 153 is transformed into translational movement of the connecting rod 150 via the cam 184. A connection 155 maintains the cam 184 fixed with respect to the shaft 153 such that the shaft 153 and cam 184 may rotate in sync.

Figure 11:
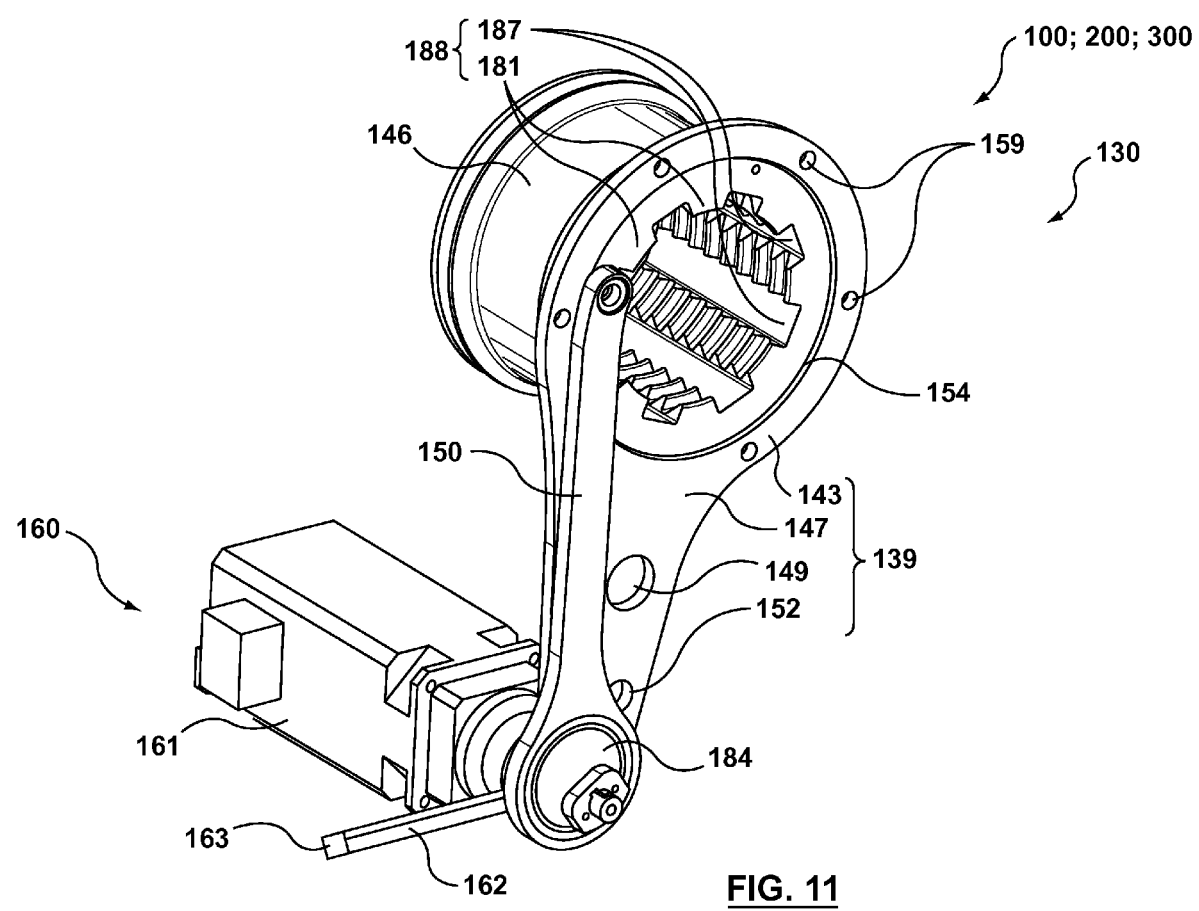
FIG. 11 depicts another partial perspective view of the molding-system clamp 130 of FIG. 6A.

FIG. 11 depicts the partial perspective view of the clamp 130 of FIG. 6A. The actuator mount 139 is configured to fixedly support the lock actuator 160. The body 147 is configured to:

(i) be fixedly connected to the piston 144 (which is not depicted in this view), and (ii) define a collar 143 that surrounds a passage 154 that is defined by the body 147. The collar 143 is fastened to a face of the piston 144 that faces along a longitudinal axis of the piston 144. The passage 154 corresponds to a piston passageway 145 that is defined by the piston 144. The body 147 defines a void 149 that is configured to reduce mass of the body 147. The collar 143 is fastened to the face of the piston 144 by fasteners 195 (depicted in FIG. 13) that are received in mounting holes 159 defined by the collar 143. The fasteners 195 (or bolts) are used to fasten the collar 143 to the face of the piston 144. The guide hole 152 is configured to receive the guide 151 (depicted in FIG. 9), and the combination of the guide hole 152 and the guide 151 is configured to prevent rotation of the body 147 of the actuator mount 139. The guide 151 is configured to: (i) prevent rotation of the body 147 with respect to the third platen 136, and (ii) permit translation of the body 147 (of the actuator mount 139) toward and away from the third platen 136 since the body 147 is bolted to the face of the piston 144 which is doing the translating. Extending from the body 147 is the position sensor mount 162, which is configured to receive a position sensor 163. The position sensor 163 is configured to: (i) move axially with the piston 144, and (ii) provide an indication of the axial position and/or rotational position of the piston 144 to a control system (not depicted) as may be required or desired.

Figure 12A:
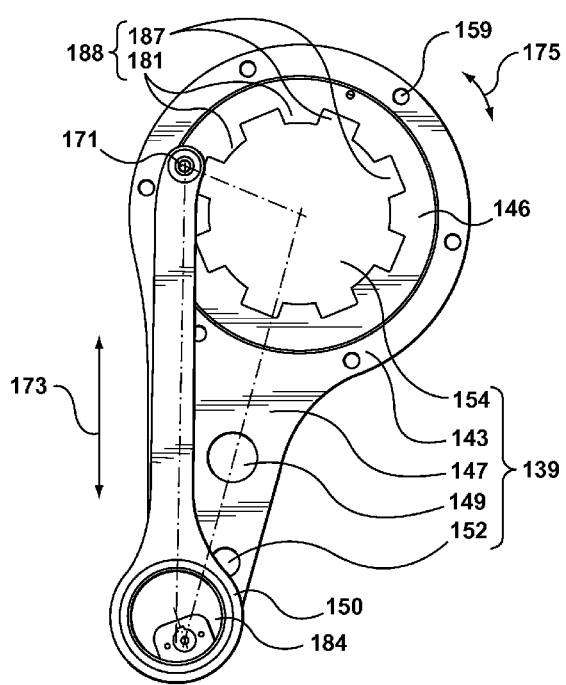
FIGS. 12A and 12B depict partial frontal views of the molding-system clamp 130 of FIG. 6A.
Figure 12B:
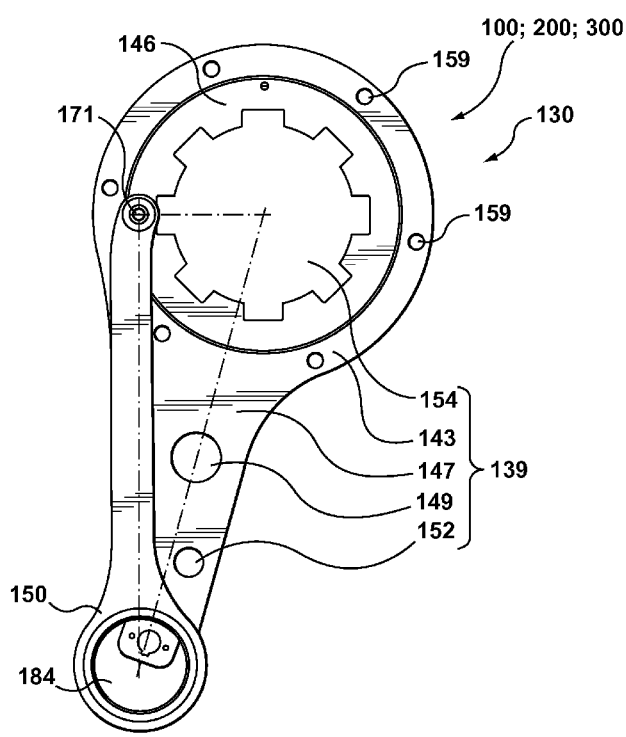

FIGS. 12A and 12B depict the partial frontal views of the clamp 130 of FIG. 6A. In FIG. 12A, the clamp 130 is placed in the unlocked condition, that is, the piston 144 is unlocked to the rod 142. In FIG. 12B, the clamp 130 is placed in the locked condition, that is, the piston 144 is locked to the rod 142. The cam 184 converts a rotational displacement of the shaft 153 into translational (reciprocating) displacement 173 of the connecting rod 150. The connecting rod 150 is pivotally connected to the lock 146 via a pivot 171. The connecting rod 150 is configured to cause rotational displacement 175 of the lock 146 once the connecting rod 150 is actuated to do so.

Figure 13A:
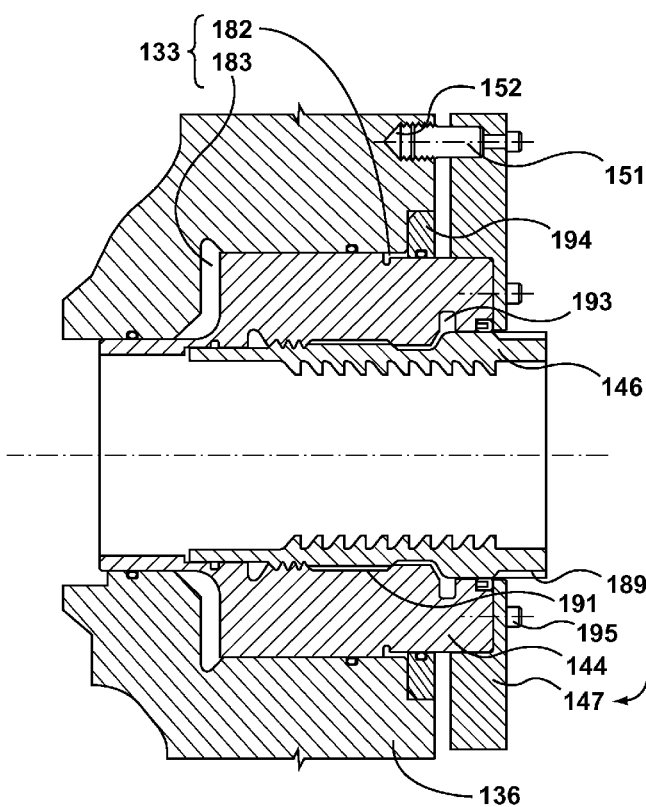
FIGS. 13A, 13B and 13C depict cross-sectional views of the molding-system clamp 130 according to a fifth non-limiting embodiment.

FIG. 13A depicts the cross-sectional view of a clamp 130 according to a fifth non-limiting embodiment. The lock 146 is configured to: (i) extend beyond the actuator mount 139, and (ii) include a belt-mounting portion 189 that is defined about a circumference of the extended portion of the lock 146. The belt 192 (depicted in FIG. 13C) or the belt 178 (depicted in FIG. 13B) is configured to interact with the belt-mounting portion 189 so as to actuate (that is, rotate) the lock 146. The lock 146 is configured to be rotatably and translatable moved fore and aft (front and back) relative to the piston 144, in sharp contrast to the lock 146 according to the other non-limiting embodiments previously described. The lock 146 includes a lock thread 191 that is configured to engage a piston thread (not depicted in FIG. 13A); the lock thread 191 and the piston thread are used to facilitate rotational movement of the lock 146 fore and aft with respect to the piston 144. The piston 144 defines an oil chamber 193 that may be used for storing and/or supplying lubrication to the lock thread 191 and the piston thread. A front cap 194 is configured to: (i) be fastened to the third platen 136, and (ii) seal against the outer surface of the piston 144 so as to permit the piston 144 to slide axially (and since the actuator mount 139 is attached to the piston 144, the actuator mount 139 will move along with the piston 144). The bore side 182 of clamp cylinder 133 is defined by the combination of the front cap 194, the outer surface of the piston 144 and the third platen 136, while the rod side 183 of the clamp cylinder 133 is defined by the axial end face of the piston 144 and the third platen 136 (the piston 144 is received in the third platen 136). It will be appreciated that the non-limiting embodiment depicted in FIG. 13A is applicable to: (i) the first platen 132 or (ii) the second platen 134.

It will be appreciated that in the case where the clamp 130 (according to the non-limiting embodiment depicted in FIG. 13) is used in the non-limiting embodiment associated with the molding system 200 depicted in FIG. 2, the front cap 194 (which is not depicted in FIG. 2) is configured to: (i) be fastened to the second platen 134, and (ii) seal against the outer surface of the piston 144 so as to permit the piston 144 to slide axially; and the bore side 182 of clamp cylinder 133 is defined by the combination of the front cap 194, the outer surface of the piston 144 and the second platen 134, while the rod side 183 of the clamp cylinder 133 is defined by the axial end face of the piston 144 and the second platen 134 (the piston 144 is received in the second platen 134).

It will be appreciated that in the case where the clamp 130 (according to the non-limiting embodiment depicted in FIG. 13A) is used in the non-limiting embodiment associated with the molding system 300 depicted in FIG. 3, the front cap 194 (which is not depicted in FIG. 3) is configured to: (i) be fastened to the first platen 132, and (ii) seal against the outer surface of the piston 144 so as to permit the piston 144 to slide axially; and the bore side 182 of clamp cylinder 133 is defined by the combination of the front cap 194, the outer surface of the piston 144 and the first platen 132, while the rod side 183 of the clamp cylinder 133 is defined by the axial end face of the piston 144 and the first platen 132 (the piston 144 is received in the first platen 132).

Figure 13B:
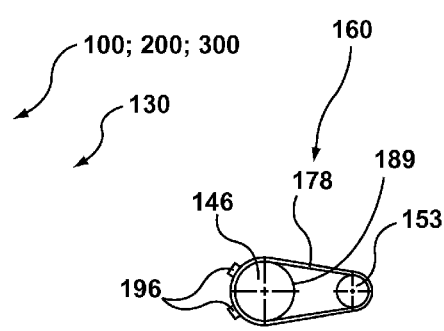

FIG. 13B depicts the partial view of the clamp 130 of FIG. 13A according to a first non-limiting variant of the fifth non-limiting embodiment. The belt 178 of the lock actuator 160 is of the open-ended type having connections 111. Each end of the belt 178 attaches respective ends of the belt 178 to respective locations of the belt-mounting portion 189 of the lock 146. Rotational movement of the shaft 153 of the electric motor 161 (not depicted in FIG. 13B) in any one of a clockwise direction and a counter-clockwise direction will actuate (that is, rotatably reciprocate) the belt 178 accordingly, and the belt 178 then likewise actuates the lock 146. The first non-limiting variant of the fifth non-limiting embodiment does accommodate for shut-height adjustment of the stationary mold portion 122 and the movable mold portion 124. Shut height adjustment permits fine control that may be required for shutting or closing mold assemblies that have different thicknesses. The non-limiting embodiments provide for mold shut-height adjustment, that's why multiple rows of teeth are provided so that the clamp may lock in a variety of shut-height positions. The fore or aft movement of the lock 146 with respect to the piston 144 allows for shut-height adjustment to be executed by actuation of the electric motor 161.

Figure 13C:
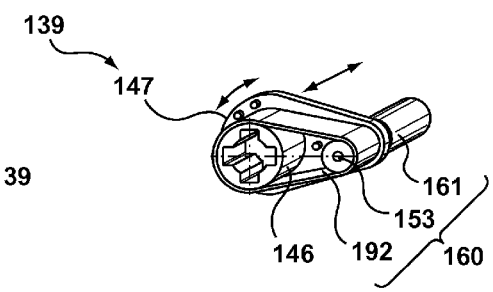

FIG. 13C depicts the perspective partial view of the clamp 130 according to the second non-limiting variant of the fifth non-limiting embodiment that does accommodate for shut-height adjustment of the stationary mold portion 122 and the movable mold portion 124. The lock actuator 160 includes a belt 192 that is configured to be driven by the shaft 153 of the electric motor 161. The belt 192 is configured to actuate (rotate) the lock 146 once it is actuated to do so. The belt 192 is an endless-type belt that: (i) engages the shaft 153, and (ii) engages the belt-mounting portion 189 of the lock 146. Rotational movement of the shaft 153 in any one of a clockwise direction and a counter-clockwise direction will actuate (rotate) the belt 192 accordingly, and the belt 192 then likewise actuating the lock 146. As the lock 146 is rotated in a selected direction, the lock thread 191 and the piston thread engage so as to rotate and translate the lock 146 fore or aft with respect to the piston 144. The fore or aft movement of the lock 146 with respect to the piston 144 allows for shut-height adjustment to be executed by actuation of the electric motor 161. Differing thickness of the mold assembly 120 may cause misalignment of complementary lock member 188 (not depicted in FIG. 13C) with the lock member 190 (not depicted in FIG. 13C) when the second platen 134 is moved to the mold-closed position. Adjustment of the position of the lock 146 allows the complementary lock member 188 and the lock member 190 to be properly aligned when the mold assembly 120 is shut, such that the lock 146 can then lockably engage and disengage the rod 142 with the piston 144. It will be appreciated that in the case of the molding system 200 and molding system 300 of FIGS. 2 and 3 respectively, the lock 146 lockably engages and disengages the rod 138 with the piston 144. Shut-height adjustment is also described in U.S. patent Ser. No. 11/451,928 (Assignee: Husky Injection Molding Systems Ltd.; Inventor: KESTLE, Martin; Filed: 13 Jun. 2006), and this filed patent application is herein incorporated by reference.

The description of the non-limiting embodiments provides non-limiting examples of the present invention; these non-limiting examples do not limit the scope of the claims of the present invention. The non-limiting embodiments described are within the scope of the claims of the present invention. The non-limiting embodiments described above may be: (i) adapted, modified and/or enhanced, as may be expected by persons skilled in the art, for specific conditions and/or functions, without departing from the scope of the claims herein, and/or (ii) further extended to a variety of other applications without departing from the scope of the claims herein. It is to be understood that the non-limiting embodiments illustrate the aspects of the present invention. Reference herein to details and description of the non-limiting embodiments is not intended to limit the scope of the claims of the present invention. Other non-limiting embodiments, which may not have been described above, may be within the scope of the appended claims. It is understood that: (i) the scope of the present invention is limited by the claims, (ii) the claims themselves recite those features regarded as essential to the present invention, and (ii) preferable embodiments of the present invention are the subject of dependent claims. Therefore, what is to be protected by way of letters patent are limited only by the scope of the following claims.

What is claimed is:

1. A molding-system clamp, comprising:
a piston being configured to impart a clamping force; a lock being configured to lock the piston to a molding-system rod;
a lock actuator; and
a connecting rod connecting the lock actuator to the lock, responsive to the lock actuator moving the connecting rod, the connecting rod urges the lock in a manner such that the piston becomes locked to the molding-system rod, and the piston may then be actuated so as to impart the clamping force to the molding-system rod;
an actuator mount, including a body configured to be: (i) fixedly positioned relative to the piston, (ii) supportive of the lock actuator, and (iii) accommodative of movement of the connecting rod; and wherein the lock actuator includes:

(i) an electric motor having:
  a shaft configured to be rotatably driven responsive to actuation of the electric motor, the body supporting the shaft; and (ii) a cam connected to the shaft, the connecting rod rotatably mounted to the cam and pivotally connected to the lock.

2. The molding-system clamp of claim 1, wherein the connecting rod is operable to rotate on a single plane of motion.

3. The molding-system clamp of claim 1, wherein the body defines a collar, the collar surrounding a passage defined by the body, the collar of the actuator mount is fastenable to a face of the piston.

4. The molding-system clamp of claim 1, wherein the body includes:
  a position sensor mount being configured to move so as to indicate a position of the piston.

5. The molding-system clamp of claim 1, further comprising:
  a guide configured to; (i) prevent rotation of the actuator mount, and (ii) permit translation of the actuator mount.

6. The molding-system clamp of claim 1, further comprising:
  a guide configured to guide translation of the actuator mount as the actuator mount is made to be translated between a clamp-force-off position and a clamp-force-on position.

7. The molding-system clamp of claim 1, wherein the lock actuator is configured to: (i) actuate the lock, and (ii) accommodate shut-height adjustment.

8. The molding-system clamp of claim 1, wherein the lock is configured to lockably engage and disengage the molding-system rod to the piston by interacting a complementary lock member with a lock member, wherein the molding-system rod includes the lock member, and the lock includes the complementary lock member.

* * * * *